(No Model.)

C. SHIELDS.
PIPE JOINT.

No. 433,750. Patented Aug. 5, 1890.

Witnesses:
Murray C Boyer
R. Schleicher

Inventor:
Christopher Shields
by his Attorneys
Howson & Howson

UNITED STATES PATENT OFFICE.

CHRISTOPHER SHIELDS, OF PHILADELPHIA, PENNSYLVANIA.

PIPE-JOINT.

SPECIFICATION forming part of Letters Patent No. 433,750, dated August 5, 1890.

Application filed May 3, 1890. Serial No. 350,446. (No model.)

*To all whom it may concern:*

Be it known that I, CHRISTOPHER SHIELDS, a citizen of the United States, and a resident of Philadelphia, Pennsylvania, have invented certain Improvements in Pipe-Joints, of which the following is a specification.

The object of my invention is to construct an improved pipe-joint especially applicable for steam, but it can be used on hot and cold water or oil pipes as well. This object I attain in the following manner, reference being had to the accompanying drawings, in which—

Figure 1:
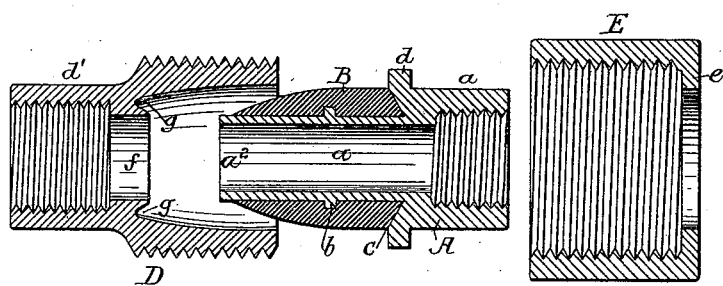
Figure 2:
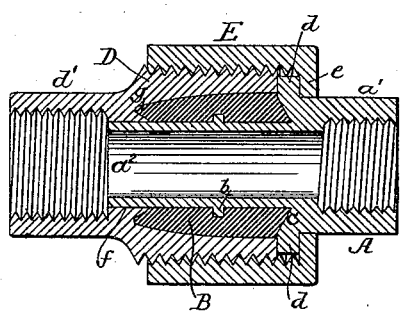

Figure 1 is a detached sectional view illustrating my improved pipe-joint. Fig. 2 is a sectional view showing the joint coupled, and Fig. 3 is a detached view showing a modification of my invention.

A is the nozzle of the coupling, having a reduced portion $a$, which is provided with an annular rib $b$. The nozzle is undercut at $c$, and molded hot around this reduced portion $a$ is a tapered sleeve B, of soft metal, this sleeve being retained on the nozzle by the rib $b$, thus dispensing with the usual tedious method of compressing the metal on the nozzle. The rear end $a'$ of the nozzle is screw-threaded to receive one end of the pipe, and has an annular flange $d$, against which bears the flange $e$ of the screw-threaded sleeve E.

The bell end D of the coupling is tapered to receive the nozzle A, and the extreme end $a^2$ of the nozzle passes into an orifice $f$. This nozzle fits sufficiently tight in the orifice to prevent the leakage of soft metal to the interior of the coupling when the two sections are being coupled together. The bell end of the nozzle is undercut at $g$, for a purpose described hereinafter. The rear portion $d'$ of the bell end is screw-threaded to receive a pipe, and the exterior of the bell end is screw-threaded to receive the sleeve E. Thus it will be seen that when the coupling is united, as shown in Fig. 2, the end $a^2$ of the nozzle passes into the orifice $f$, and the soft metal being confined between the bell end and the nozzle is forced into the undercut portion $g$ of the bell end, and is prevented from spreading at the rear by being forced into the undercut portion $c$ of the nozzle. Thus a tight metallic joint is secured.

Figure 3:
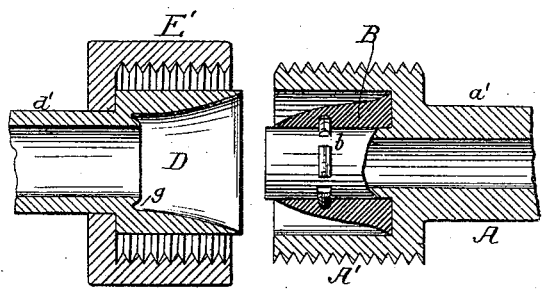

In Fig. 3 I have shown the sleeve B and the bell end having an outline somewhat different from that shown in Figs. 1 and 2, and the nozzle A has a screw-threaded portion A', which passes over the bell end D, and a sleeve E' on the bell end screws onto this threaded portion, the exterior surface of the bell end fitting snugly in the portion A'. The soft metal is confined between the bell end and the spindle; but in this instance the spindle is not undercut.

I claim as my invention—

1. The combination of the nozzle, a flange thereon, a soft-metal sleeve molded on the nozzle between its end and the flange, a bell end adapted to pass over said sleeve, with a screw-sleeve securing the nozzle and bell end together and compressing the soft metal, so as to make a metallic joint, substantially as described.

2. The combination, in a pipe-coupling, of the nozzle having a reduced portion $a$, soft-metal sleeve adapted to said reduced portion, a bell end, an orifice therein of the same diameter as the exterior of the reduced portion of the nozzle, so that when the two are coupled the reduced portion of the nozzle will pass into said orifice, substantially as and for the purpose set forth.

3. The combination, in a pipe-coupling, of the nozzle having a reduced portion, a sleeve of soft metal on said reduced portion, a bell end having an orifice therein of the same diameter as the exterior of the reduced portion of the nozzle, and undercut at $g$, substantially as and for the purpose set forth.

4. The combination, in a pipe-coupling, of the nozzle, reduced portion, said nozzle being undercut at $c$, a bell end undercut at $g$, and a soft-metal sleeve adapted to the reduced portion of the nozzle, so that when the nozzle and bell end are brought together the soft-metal sleeve will be forced into the undercut portions of the nozzle and bell end, substantially as described.

In testimony whereof I have signed my name to this specification in the presence of two subscribing witnesses.

CHRISTOPHER SHIELDS.

Witnesses:
 HARRY SMITH,
 HENRY HOWSON.